Oct. 28, 1924.  
J. B. PAWLEY  
1,513,268  
AUTOMATIC FILM WINDING CAMERA  
Filed April 9, 1923  
2 Sheets-Sheet 2

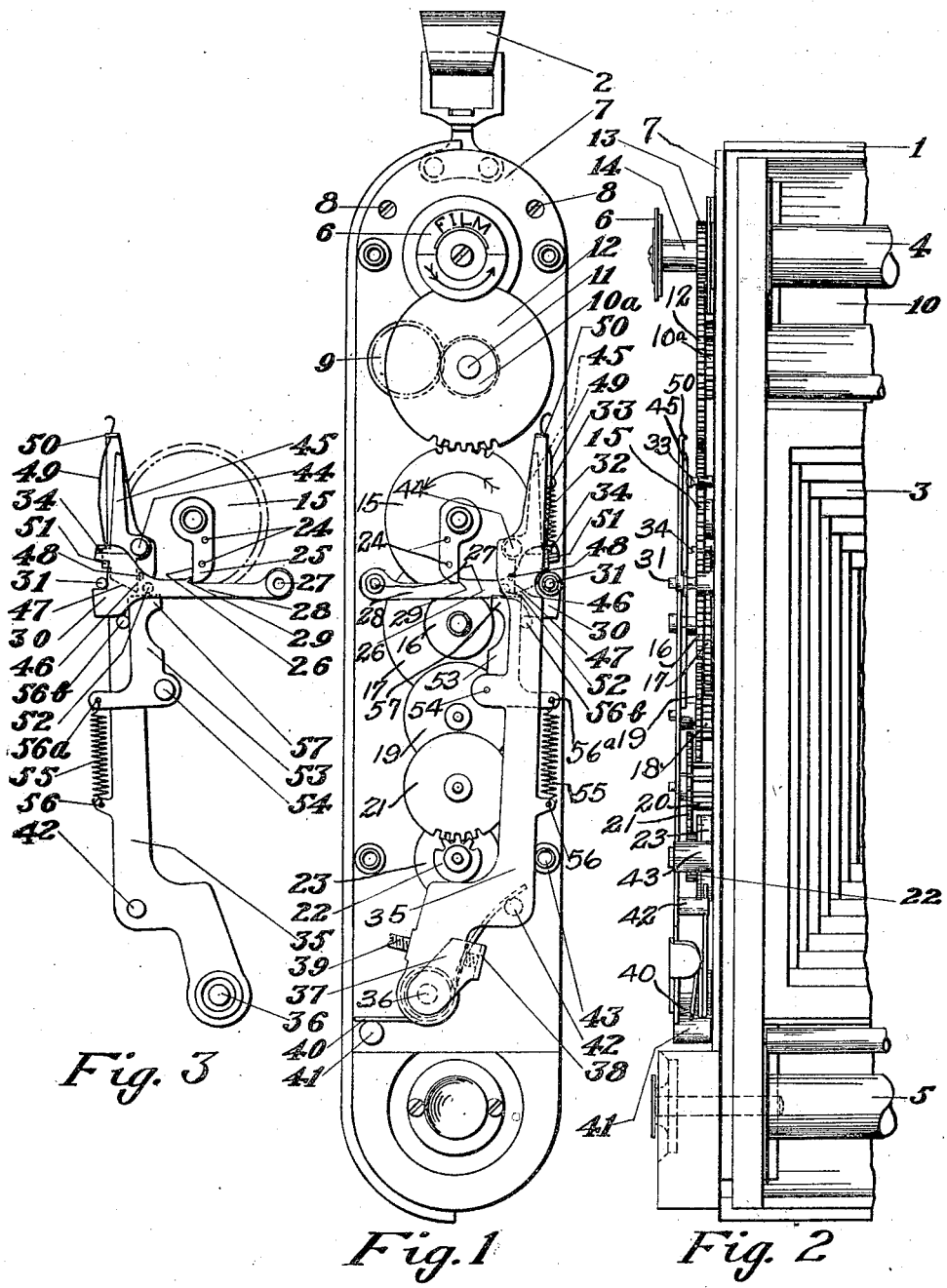

INVENTOR  
JOHN B. PAWLEY  
BY  
Philip S. Hopkins  
ATTORNEY

Patented Oct. 28, 1924.

1,513,268

UNITED STATES PATENT OFFICE.

JOHN B. PAWLEY, OF BINGHAMTON, NEW YORK, ASSIGNOR, BY MESNE ASSIGNMENTS, TO ANSCO PHOTOPRODUCTS, INC., OF NEW YORK, N. Y., A CORPORATION OF NEW YORK.

AUTOMATIC FILM-WINDING CAMERA.

Application filed April 9, 1923. Serial No. 630,691.

*To all whom it may concern:*

Be it known that I, JOHN B. PAWLEY, a citizen of the United States, and a resident of the city of Binghamton, county of Broome, and State of New York, have invented certain new and useful Improvements in an Automatic Film-Winding Camera, of which the following is a description, reference being had to the accompanying drawings, which form a part of this specification.

This invention relates generally to cameras and is particularly directed to that type of camera adapted to use roll film.

More specifically my invention is directed to a roll film camera having power means for automatically winding up the exposed portion of the film and bringing a new unexposed portion into position for exposure; such winding mechanism being controlled by the operation of the shutter and adapted to be actuated immediately after the same has been operated to make an exposure.

It is an object of my invention to provide a simple, practical and efficient stopping and releasing mechanism for the power driven winding means, such stopping and releasing device being connected on the one hand with the gear train forming a part of the winding device and on the other hand with the shutter operating mechanism.

A second and important object is to provide a safety device which cooperates with the stopping and releasing mechanism in a manner to prevent accidental operation or displacement of the same.

A third object is to so construct and arrange the various parts of the winding and controlling mechanisms of the camera that the highest degree of efficiency and accuracy is obtained therefrom with the least amount of labor and material possible.

A further object is to construct the parts of this camera in a manner to render the same entirely automatic in their operation thereby rendering the camera foolproof and of the easiest manipulation.

Heretofore in cameras of the automatic type there has always been the danger of accidentally releasing the mechanism to wind the film and thus causing a waste which is both annoying and expensive. It has been found that because of the delicately adjusted parts of cameras of this character, dropping the same or accidentally laying the camera down with a jar, would result in releasing the winding mechanism with the aforementioned results. It has been my object therefore, to eliminate this objection and to provide the winding mechanism with a safety device which is automatic in its operation and, cooperating with the stopping and releasing mechanism of the camera, effectively prevents the operation of said releasing and stopping mechanism at all times except when the mechanism is actuated by the shutter controlling means.

It is also well known that heretofore, in cameras of the character described the stopping and releasing devices have not been entirely satisfactory in that no absolutely positive means has been devised which would at all times properly release and stop the winding mechanism when it should. By my invention I have overcome this difficulty with an exceedingly simple arrangement of levers which are always positive in their operation and dependable at all times to perform the function required of them.

My invention is an improvement upon that patented in and by the United States Letters Patents No. 1,197,901, dated September 12, 1916; No. 1,216,543, dated September 20, 1917; and No. 1,268,805, dated June 4, 1918, all issued to Ansco Company as the assignee of Carl Bornmann, Ezra C. Clark and George W. Topliff.

Other objects and advantages in details of construction and operation will be apparent as the description proceeds, reference being had to the accompanying drawings wherein like reference numerals indicate like parts.

In the drawings:

Figure 1 is a side view of my improved camera, the cover or cap being removed therefrom to show the assembled parts.

Figure 2 is a back view of the side of the camera carrying the film winding mechanism.

Figure 3 is a detailed bottom plan view of my improved releasing and stopping mechanism and safety device.

Figures 4, 5, 6:
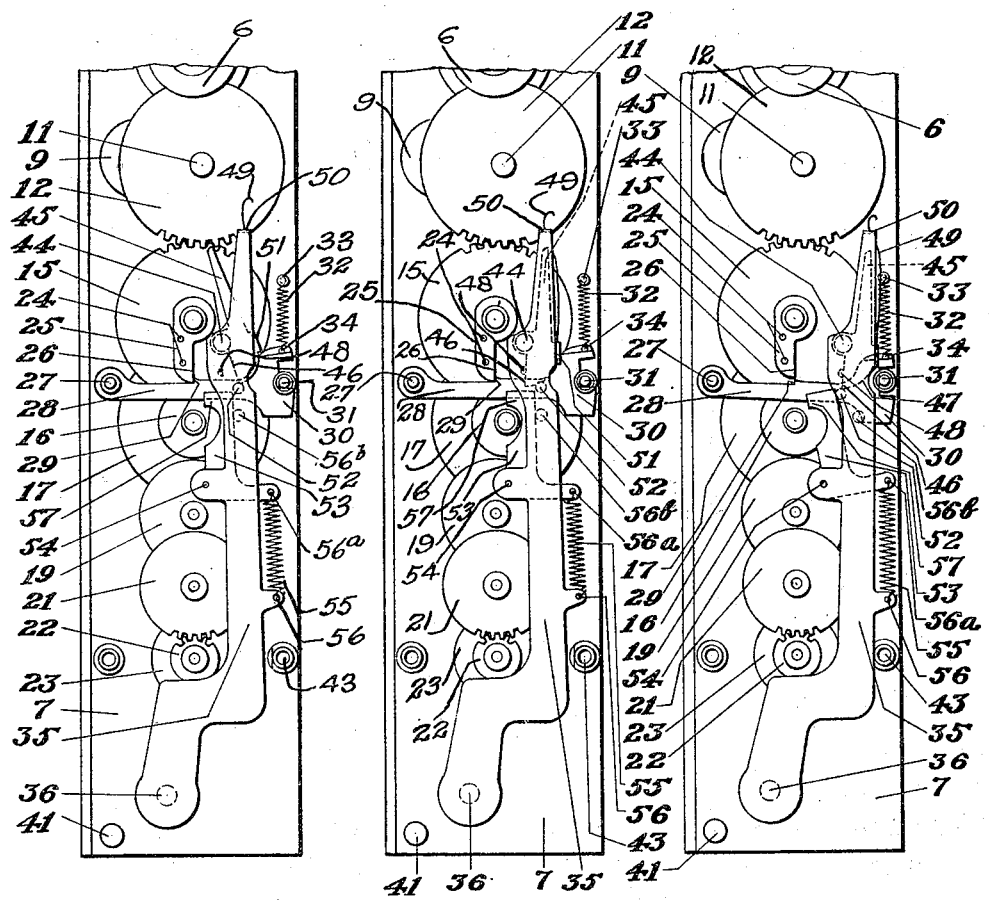
Figures 4, 5 and 6 are diagrammatic views showing in detail the operation of the elements constituting my invention in their various positions.

A camera of the usual folding type is indicated generally by the reference numeral 1, and as shown is provided with the carrying handle 2, bellows 3, film take up and supply spools 4 and 5, and winding key 6. These parts are all of ordinary construction and require no detailed description.

A base plate 7 is suitably secured to one side of the camera 1, as by screws 8, and upon this base plate is mounted the mechanism which drives the take up spool 4 to wind the exposed portion of the film thereon. This winding mechanism comprises primarily a pinion 9 which is driven directly by a spring motor (not shown) extending across the body of the camera and concealed in the spool chamber 10 of the winding spool 4. For details regarding this motor see the above mentioned Letters Patent #1,197,901.

The pinion 9 meshes with and drives the pinion $10^a$, journaled at 11, said pinion 10 being carried by the gear 12. The gear 12 meshes with and drives a gear 13 which is mounted upon the shaft 14. This shaft 14 extends inwardly thru the side of the camera and is provided with a key at its inner end for engaging the usual slot in the end of the take up spool 4. The construction of these parts is well known and needs no detailed explanation here. A full description of the same however, may be found in the aforementioned Letters Patent #1,197,901. Suffice it to say that upon the operation of the pinion 9 driven by the spring motor, the take up spool 4 will be rotated thru the gears $10^a$, 12 and 13, and that if desired said spool may be also rotated manually thru the medium of the winding key 6, secured to shaft 14.

Gear 12 meshes with the gear 15 which in turn meshes with the pinion 16 carried by gear 17. The latter, in turn meshes with the pinion 18 carried by gear 19, which in turn meshes with pinion 20, carried by gear 21, and said last named gear 21 drives the pinion 22, which is secured to and drives the governor indicated generally at 23. The construction of this governor is not shown in detail and forms no part of this invention. Any satisfactory type of governor which will suitably regulate the speed of the driving mechanism may be used.

The spring motor combined with the gear train just described, including the governor 23, constitutes the mechanism for driving the take up spool 4. The controlling means for this winding mechanism, including my new stop and release device and safety catch, will now be described.

Carried by the gear 15 and securely fastened thereto by rivets 24, is a pawl or dog 25 having one side and end thereof straight and flat forming a stopping surface 26. It may be here stated that the ratio of the gear 15 with relation to the gear 13, which drives the take up spool 4, is such that one complete revolution of the gear 15 results in winding upon the spool 4 a length of film equal to or slightly greater than the size of the picture which the camera is adapted to take. It will therefore be readily understood that if the pawl 25 is held in a given position, by a means to be hereafter described, then released to make one complete revolution with gear 15 and is again stopped and held at its starting point, sufficient film will have been wound upon the spool 4 to present in the focal plane of the camera a fresh unexposed length of film.

Pivoted at 27 on one side of the base plate 7 and extending laterally across said base plate above the gear train, is a lever 28 provided intermediate its ends with an upstanding lug forming a shoulder 29. This shoulder cooperates with the flat surface 26 of the pawl 25 and acts to stop and release said pawl when properly actuated by means about to be described. The free end 30 of the lever 28 is bifurcated as shown clearly in Figures 4, 5 and 6, said bifurcated portion being guided by the pin 31. A small tension spring 32 is anchored at one end on the base plate as at 33, the opposite end thereof being secured to the free end 30 of the lever 28 as at 34. It will thus be seen that the lever 28 is normally held under tension in a position whereby the shoulder 29 is situated in the path of the pawl 25. The parts just described constitute the stopping and releasing mechanism for the film winding means.

The controlling means for the lever 28 comprises primarily a lever 35 which is pivoted at its lower end upon a shaft 36. Motion is imparted to the lever 35 thru the medium of the shaft 36 which has secured to the end thereof, an arm 37 provided with a right angled extension 38, which engages with a screw 39 adjustably mounted in upstanding ears carried by the lever 35. A tension spring 40 is coiled about the pivot of the lever 35 and has one end anchored against the post 41 on the base plate 7 and the opposite end secured to the lever 35 as at 42. Briefly the operation of this lever is as follows: The shaft 36 is mounted within the camera for rocking movement which is imparted thereto thru suitable connections with the shutter actuating mechanism (not shown). The lever 35 is normally held in the position shown in Figure 1 by the tension spring 40, but upon the rocking of the shaft 36, due to the actuation of the shutter operating means, said lever is pivoted to the left in Figures 1, 4, 5 and 6. As soon as the shutter is released the tension spring 40 operates to throw the lever 35 back to its normal position. It is upon this backward motion of the lever 35 that the releasing means above described is operated, thereby causing the actuation of the winding mechanism only after the shutter has been operated to make an exposure. The connections between the shaft 36 and the shutter operating means have not been shown in this application as they form no part of this invention. A detailed description of the same however, is to be found in the above mentioned Letters Patent #1,268,805.

A post 43 carried by the base plate 7 acts as a stop to limit the movement of the lever 35 in one direction. Adjacent the free end of the lever 35 there is pivoted at 44 a pawl 45, the lower end of which is provided on one side with a straight or flat shoulder 46 and a beveled portion 47. A pin 48 carried on the under side of the lever 35 is located within the path of the straight or flat portion 46 of the pawl 45 and limits the movement of said pawl in one direction. A small leaf spring 49 is anchored at one end upon an offset portion 50 at the extreme end of the lever 35, the opposite end being secured to the pawl 45 as at 51, the purpose of this spring is to normally hold the flat edge 46 of the pawl in contact with the pin 48. Carried by the lever 28 and located within the path of the edge of the pawl 45 is a pin 52. It will therefore, be readily observed that when the lever 35 is pivoted to the left in Figures 1, 4, 5 and 6 the flat edge 46 of the pawl 45 will engage against the pin 52, causing said pawl 45 to rock upon its pivot against the tension of the spring 49 as clearly shown in Figure 4. Continued movement to the left of the lever 35 will cause the pawl 45 to snap past the pin 52 and assume the position shown in Figure 5. It will be noted that the spring 49 has now returned the pawl 45 to its normal position against the pin 48 carried by the lever 35, and that the beveled edge 47 of said pawl engages against the pin 52 carried here that stop lever 28. It may be remarked here that with the parts in the position just described, and as shown in Figure 5, the shutter operating mechanism has been depressed to its full extent, resulting both in the operation of the shutter to make an exposure and in the rocking of shaft 36 to move the lever 35 and the parts carried thereby to assume the position shown in Figure 5. Upon the return movement of the lever 35 to the right, due to the action of spring 40, the beveled edge 47 of the pawl 45 rides against the pin 52, and because the pawl 45 is held against movement by the pin 48 such action will result in depressing the lever 28 against the action of spring 32 and thus release the shoulder 29 of said lever from engagement with the pawl 25. This action is clearly shown in Figure 6. As soon as the lever 35 has moved far enough to the right to disengage the pawl 45 from the pin 52 the lever 28 is pulled by its spring 32 back into the normal position shown in Figure 1 with the shoulder 29 in the path of the pawl 25 to engage and stop the same when one complete revolution thereof has been made.

The safety catch heretofore referred to comprises a pawl 53 pivoted at 54 on the under side of the lever 35. A coil spring 55 is anchored at one end 56 to the lever 35 and is secured at its opposite end to the lower extension 56$^a$ of the pawl 53. The function of this spring is to normally hold the pawl 53 in engagement with the pin 56$^b$ also carried on the under side of the lever 35. The free end 57 of the pawl 53 normally rests directly beneath the pin 52 on the lever 28 and it will be readily understood that so long as these elements are so positioned there is no possibility of the lever 28 being lowered out of engagement with the pawl 25 due to accidental jarring or shaking of the camera, the safety pawl 53 always being in a position to engage and hold the lever 28 from its downward releasing movement except when the controlling lever 35 is properly actuated to release the mechanism. Reference to Figures 4, 5 and 6 will disclose the exact operation of the safety pawl when the controlling lever is so operated. As shown in Figure 4 when the controlling lever 35 is moved to the left the safety pawl 53 is carried thereby out from under the pin 52. On the return movement of the lever 35 the pawl 45, engages the pin 52 and depresses the lever 28 slightly before the safety pawl 53 can return to a position beneath the same. Upon the continued return movement of the lever 35 this safety pawl engages against the side of pin 52 and is rocked thereby on its pivot against the action of the spring 55. This action, as is clearly disclosed in Figure 6, permits the stop and releasing lever 28 to be moved downwardly a sufficient distance to release the pawl 25. As soon as the lever 28 returns to its normal position however, as heretofore described, the pin 52 will disengage the side of the safety pawl 53 and the spring 55 will return the same to the normal or safety position shown in Figure 1.

It has been found by experience that without such a safety device as just described a sudden jar or shaking of the camera would result in rocking the stop and release lever 28 sufficiently to disengage the pawl 25. It will therefore, be seen I have provided a positive and efficient means for preventing this difficulty which is entirely automatic in its operation and entirely practical from the point of manufacture.

The operation of the device as just described is briefly as follows: A film having been properly placed in the camera and the spring motor wound to its full extent, the operator desiring to take a picture opens his camera, focuses on the object to be photographed and depresses the shutter release in the usual manner. As before explained and as specifically illustrated and described in the patents herein before mentioned this results in rocking the shaft 36 and consequently a movement of the controlling lever 35 to the left in Figure 1. As the lever 35 moves to the left the pawl 45 carried thereby engages with the pin 52 on the lever 28 snapping past the same at the end of the movement to the left. The exposure having been made upon the downward stroke of the shutter operating means, the operator then releases the same which permits the spring 40 to exert its tension against the lever 35 and return the same to the right. It is upon this return movement that the beveled edge 47 of the pawl 45 rides against the pin 52 thus depressing the lever 28 and disengaging the same from the pawl 25 which permits the release of the gear train driven by the spring motor which then drives the take up spool 4 to wind up the exposed portion of the film and present a fresh length thereof in position for subsequent use. The pawl 25 being carried by one of the gears in the driving train makes a complete revolution with such gear and upon reaching the position from which it started is again engaged and stopped by the shoulder 29 of the lever 28. This immediately stops the action of the winding mechanism, and the safety pawl 53 again being in its normal position, all further operation of the winding mechanism is prevented until the next operation of the shutter to make another exposure.

My invention then discloses a new and improved camera whereby double exposures are prevented, due to the fact that the film is automatically wound up after each exposure, greater speed in the making of exposures is permitted, due to the fact that it is unnecessary to wind the film by hand, a positive and simple stopping and releasing mechanism is provided which eliminates possibility of improper function of the winding mechanism and a safety device has been included which doubly insures the accurate operation of the mechanism.

The form of my invention herein shown and described is the preferred embodiment thereof but it is to be understood that many changes and variations in details of construction and operation are possible and I do not therefore, limit myself to the specific structure shown other than by the appended claims.

I claim:

1. In combination with a camera, means for automatically shifting the film therein, releasing and stopping mechanism for said automatic means, a controlling lever, and safety means including a pivoted arm carried by said controlling lever which renders said releasing and stopping mechanism inoperative at all times except upon actuation of said lever.

2. In combination with a camera, means for automatically shifting the film therein, releasing and stopping mechanism for said automatic means, a controlling lever, and safety means including a spring controlled pivoted arm carried by said controlling lever, which renders said releasing and stopping mechanism inoperative at all times except upon actuation of said lever.

3. In combination with a camera, means for automatically shifting the film therein, releasing and stopping mechanism for said automatic means, a controlling lever and safety means including a spring controlled pivoted arm carried by said controlling lever, said arm being normally disposed directly beneath said pin, whereby said releasing and stopping mechanism is normally rendered inoperative.

4. In combination with a camera, means for automatically shifting the film therein, releasing and stopping mechanism for said automatic means including a pivoted lever having a pin thereon, a controlling lever, and safety means comprising a spring controlled pivoted arm carried by said controlling lever and normally disposed directly beneath said pin, whereby said releasing and stopping mechanism is normally rendered inoperative, and means on the controlling lever for limiting the movement in one direction of said safety arm.

5. In combination with a camera, means for automatically shifting the film therein, releasing and stopping mechanism for said automatic means including a stop lug carried by said gear train and a spring controlled pivoted lever having a shoulder coacting with said lug, the free end of said lever being bifurcated, and means coacting with said bifurcated end for guiding said lever in its movement, and a controlling lever cooperating with said releasing and stopping mechanism.

6. In combination with a camera, means for automatically shifting the film therein, releasing and stopping mechanism for said automatic means and a pivoted spring actuated controlling lever for said releasing and stopping mechanism, and means carried by said controlling lever for operating the releasing and stopping mechanism.

7. In combination with a camera, means for automatically shifting the film therein, releasing and stopping mechanism for said automatic means, a pivoted spring actuated controlling lever, and means carried by said controlling lever including a spring controlled pawl for operating said releasing and stopping mechanism.

8. In combination with a camera, means for automatically shifting the film therein, releasing and stopping mechanism for said automatic means including a pivoted lever having a pin thereon, a spring actuated pivoted controlling lever for said releasing and stopping mechanism including a spring actuated pawl carried by said controlling lever and cooperating with said pin.

9. In combination with a camera, means for automatically shifting the film therein, releasing and stopping mechanism for said automatic means including a pivoted lever having a pin thereon, a spring actuated pivoted controlling lever for said releasing and stopping mechanism including a spring actuated pawl carried by said controlling lever and cooperating with the pin on said stop lever, and means on said controlling lever for limiting the movement of said pawl in one direction.

10. In combination with a camera, means for automatically shifting the film therein, releasing and stopping mechanism for said automatic means including a pivoted lever, a controlling lever, and means carried by said controlling lever for actuating said releasing and stopping lever, and means also carried by said controlling lever for normally preventing the operation of said stopping and releasing lever.

11. In combination with a camera, means for automatically shifting the film therein including a gear train, a stopping means carried by one of the gears of said train, a pivoted lever normally held in engagement with said stop means, a pin on said lever, a controlling mechanism for said lever, and means carried by said controlling mechanism operative upon movement in one direction of said controlling means to engage said pin and release said lever from engagement with said stop means.

12. In combination with a camera, means for automatically shifting the film therein, releasing and stopping mechanism for said automatic means, and separate means normally preventing the displacement of said releasing and stopping mechainsm to permit the actuation thereof.

13. In combination with a camera means for automatically shifting the film therein, releasing and stopping mechanism for said automatic means including a pivoted lever having engagement with said automatic means, a controlling lever for said releasing and stopping mechanism operating to displace said releasing and stopping lever in one direction of its movement and means carried by said controlling lever for preventing such displacement at all times except upon actuation of said controlling lever.

14. In combination with a camera, means for automatically shifting the film therein, releasing and stopping mechanism for said automatic means, controlling means therefor, and safety means independent of and auxiliary to said mechanism which renders the same inoperative at all times except upon the actuation of said controlling means.

15. In combination with a camera, means for automatically shifting the film therein, releasing and stopping mechanism for said automatic means, a controlling lever, and safety means independent of and auxiliary to said mechanism which renders the said automatic means inoperative at all times except upon actuation of said controlling lever.

16. In combination with a camera, means for automatically shifting the film therein, controlling means for said automatic means, and safety means independent of and auxiliary to said automatic means for rendering the same inoperative at all times except upon actuation of said controlling means.

17. In combination with a camera, means for automatically shifting the film therein, controlling mechanism for said automatic means, and auxiliary safety means carried by said controlling means for normally preventing the operation of said automatic means.

JOHN B. PAWLEY.